(No Model.) 2 Sheets—Sheet 1.
C. E. SCRIBNER.
TESTING APPARATUS FOR MULTIPLE SWITCH BOARDS.
No. 416,808. Patented Dec. 10, 1889.
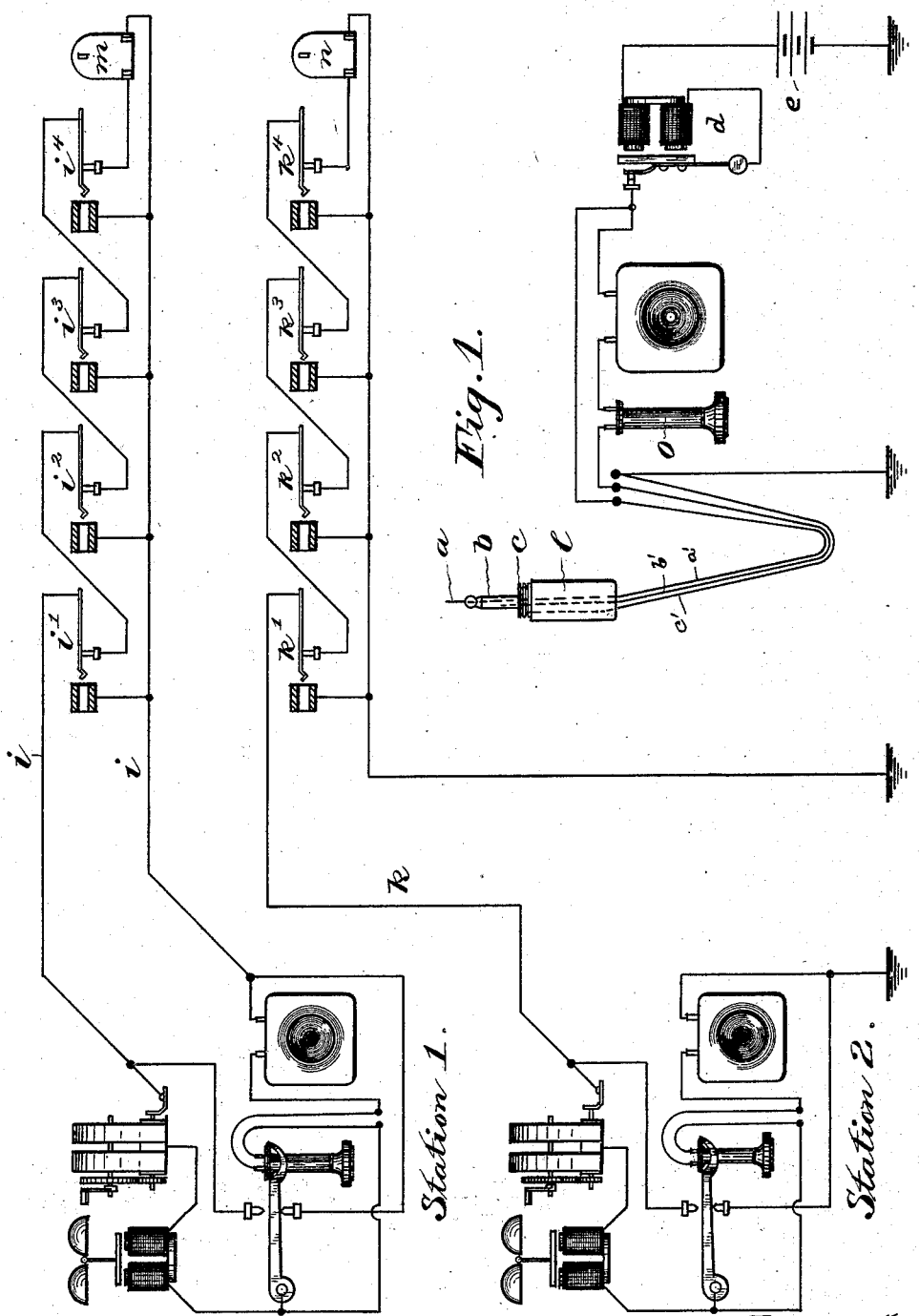

(No Model.) 2 Sheets—Sheet 2.
C. E. SCRIBNER.
TESTING APPARATUS FOR MULTIPLE SWITCH BOARDS.
No. 416,808. Patented Dec. 10, 1889.
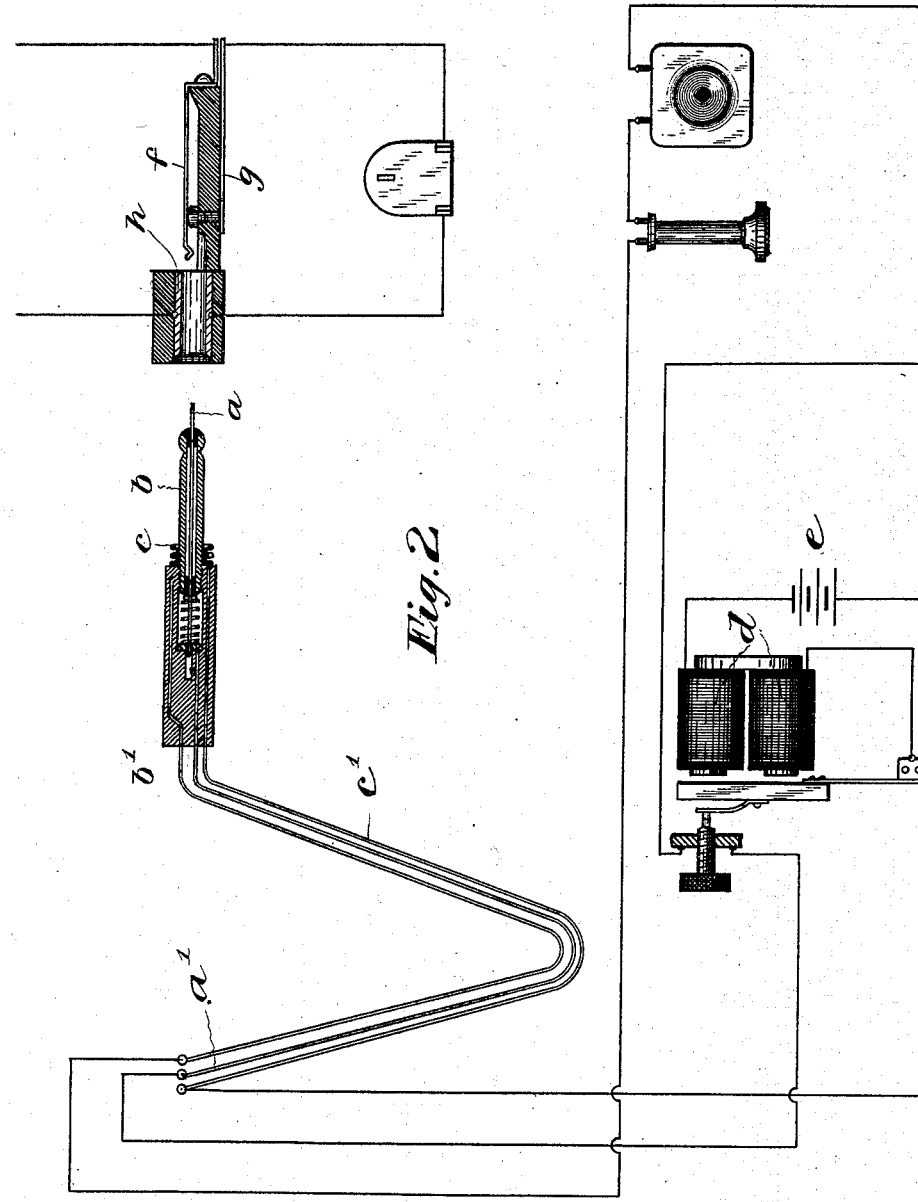

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TESTING APPARATUS FOR MULTIPLE SWITCH-BOARDS.

SPECIFICATION forming part of Letters Patent No. 416,808, dated December 10, 1889.

Application filed June 1, 1888. Serial No. 275,752. (No model.)

*To all whom it may concern:*

Be it known that I, CHARLES E. SCRIBNER, a citizen of the United States, residing at Chicago, in the county of Cook and State of Illinois, have invented a certain new and useful Improvement in Testing Apparatus for Multiple Switch-Boards, (Case 156,) of which the following is a full, clear, concise, and exact description, reference being had to the accompanying drawings, forming a part of this specification.

My invention relates to multiple switch-board systems, and its object is to furnish ready means for testing to determine whether a line wanted or called for is in use.

My invention is applicable to metallic-circuit systems or single-circuit systems, but is more especially designed for use in mixed systems—that is to say, systems in which single telephone-circuits and metallic telephone circuits are used conjointly. The telephone-lines may be run in the usual manner, a metallic circuit being connected through the spring and contact-point of a switch on each of the boards and through an annunciator and back through the ring or test-piece of each of said switches. The single-line circuit is connected in the same manner through a spring and contact of a switch on each of the switch-boards and through an annunciator back to a test-piece or ring on each of the switches.

In the drawings, which are illustrative of my invention, Figure 1, Sheet 1, is a view of two telephone-lines, one single and the other metallic, connected each with four different spring-jack switches, which will be considered as upon different boards, and my testing apparatus. Fig. 2, Sheet 2, is a view showing the testing apparatus more in detail and a detailed view of a spring-jack switch in a line.

Like parts are indicated by similar letters and numerals of reference in the different figures.

I will first describe the testing apparatus in detail as shown in Fig. 2.

The test-plug shown is provided with three contacts, to wit: the needle $a$, normally pressed upwardly by a spring; the metallic shank $b$ of the plug, provided with the ball for making contact with the spring or lever of any switch in which the test-plug may be inserted, and the spring $c$, also insulated from the shank. We have thus in each test-plug three insulated terminals, which I preferably make in the form shown. With each of these terminals a separate strand of a cord is connected. The terminal $c$ is connected with strand $c'$, which leads to ground. Terminal $b$ is connected with the wire $b'$, which leads through the operator's telephone and the contact of the buzzer $d$ and battery $e$ to ground. Terminal $a$ connects with strand $a'$, which leads to the same contact of the buzzer $d$ and through battery $e$ to ground. The spring-jack switch shown in Fig. 2 is of the usual construction, having a spring or lever $f$, which rests upon its normal contact $g$. The lever and contact or anvil are insulated from the test ring or piece $h$. On inserting the test-plug in the spring-jack switch three separate connections will be made therewith—that is to say, the needle $a$ will connect with contact $g$, the ball-lifting lever $f$ from said contact will form connection with said lever, while the terminal $c$ of the test-plug will be electrically connected with the test-ring $h$. Thus the test-ring is connected through terminal $c$ and strand $c'$ to ground. The contact-point is connected through the needle or terminal $a$ with strand $a'$ through the buzzer and battery to ground, while the lever $f$ is connected through the ball on shank $b$ of the plug, through strand $b'$, through the operator's telephone to said buzzer, and through said buzzer and the battery to ground.

In Fig. 1 the subscriber's station 1 is upon the metallic circuit $i$, which extends from said station through the switches $i'$ $i^2$ $i^3$ $i^4$ of different boards and through an annunciator back to the test-rings of said switches, and thence back to the subscriber's station 1. The subscriber's station 2 is connected by a single wire $k$ with the central office. The circuit of wire $k$ may be traced from ground at subscriber's station 2, through spring-jack switches $k'$ $k^2$ $k^3$ $k^4$ and through an annunciator, back through test-pieces of said spring-jack switches and directly to ground.

The test-plug $l$ of Fig. 1 is the same as the test-plug illustrated in Fig. 2. The spring-jack switches $i'$, &c., and $k'$, &c., are preferably of the same construction as the spring-jack switch illustrated in detail in Fig. 2.

The annunciators $m$ $n$ of the different lines may be wound so as to have a resistance of, say, fifty ohms each. The resistance of the different telephone-circuits, including the subscribers' outfits, may be each, say, from three hundred and fifty to four hundred ohms. The resistance of the coils of the buzzer or vibrator $d$ may be, say, fifty ohms. The battery $e$ may consist, say, of four cells of ordinary gravity-battery. The buzzer and battery are so adjusted with respect to resistance and current that the buzzer will not vibrate if the circuit closed at terminal $a$ of the test-plug contains a resistance substantially higher than fifty ohms—that is to say, of substantially higher resistance than that of the annunciators $m$ or $n$ of the different lines.

I will now describe the manner of testing a telephone-circuit—we will say at switch $i^3$ of the third board—to determine whether the line $i$ is connected or in use at any other of the boards—that is to say, whether connection has been made with any one of the spring-jack switches $i'$, $i^2$, or $i^4$ of the line $i$. I will suppose, first, that the line is not busy, in which case all the spring-jack switches of the line will be closed, as shown. The operator inserts test-plug $l$ into switch $i^3$, and thereupon the three separate connections are made as heretofore described with respect to the test-plug and spring-jack shown in Fig. 2. The test-piece of switch $i^3$ is thus connected with the terminal $c$ of test-plug $l$, and thence through wire $c'$ to ground. The shank or terminal $b$ of the test-plug is connected with the lever of switch $i^3$, while the other terminal of test-plug $l$—that is to say the needle—is connected with the contact-point, the lever being at the same time lifted from the said contact-point or anvil. The circuit of battery $e$ will thus be closed through the vibrator $d$, the wire or strand $a'$, and terminal $a$ to the contact or anvil of switch $i^3$, and thence the circuit may be traced through switch $i^4$, and thence through annunciator $m$, and thence to the test-piece of switch $i^3$, and thence through terminal $c$ and strand $c'$ to ground. The resistance in the circuit thus formed between the terminal $a$ of the test-plug and the ground-wire $c'$ will be only that of the annunciator $m$, and hence the buzzer $d$ will be set in vibration to interrupt the circuit. It will be noted, however, that the circuit as just traced does not include the operator's telephone $o$. A derived circuit, however, is completed through the telephone $o$, which may be traced as follows: beginning at battery $e$ and passing through the contact of the buzzer, thence by wire $b'$ to the terminal $b$ of the test-plug, thence to the lever of switch $i^3$, thence over line $i$ through subscriber's station 1 and back over the return portion of circuit $i$ to the test-piece of switch $i^3$, and thence, as before traced, by terminal $c$ and strand $c'$ to ground. It will be observed that the resistance of the line $i$ and the subscriber's bell at station 1 would be so great that the battery $e$ would not be strong enough to cause the buzzer to vibrate when closed as thus traced simply through wire $i$. If, however, the battery be closed through this high-resistance circuit, one listening at the telephone $o$ may determine whether or not the vibrator or buzzer is being actuated. The derived circuit of battery $e$ through the annunciator $m$, being of low resistance, will permit sufficient current to pass from the battery through the vibrator to set it in operation. Therefore, when there is no connection with any spring-jack of the line and a test is made at any one of said spring-jacks, the operator listening at the telephone will hear the hum caused by the buzzer. Thus if he hears the hum he will know that the line is free. Suppose, however, a connection had been made at switch $i^4$. In this case the annunciator is disconnected as the lever of switch $i^4$ is lifted from its contact-point, the lever being connected with the plug inserted at $i^4$, and thence to the other telephone-line, which is connected to the line or switch $i^4$. The two branches of the test-circuit would in this case be traced through two telephone lines of, say, four hundred ohms each, making a joint resistance of two hundred ohms, which would be so great that battery $e$ would not set the buzzer in vibration, and hence no sound would be heard in the telephone $o$ and the operator would know that the line was busy. Suppose, however, the connection, instead of being at switch $i^4$, were upon the other side of the switch $i^3$—as, for example, at switch $i'$. Switch $i'$ in that case would be open. The circuit, however, would be closed from the needle of the test-plug when inserted in switch $i^3$ through the annunciator $m$, thence to the test-piece of spring-jack switch $i^3$, and thence through terminal $c$ and strand or wire $c'$ to ground. The buzzer would thus be set in vibration. This vibration, however, would cause no sound in the telephone $o$, since the wire $i$ would be open at switch $i'$, and hence no sound would be heard in the telephone. Thus it will be seen that if the line is not in use a sound will be heard in the telephone. If the line is connected at a switch of the series of switches of the line back of the switch at which the test is made, the buzzer will not respond, since the derived circuit through the annunciator of the line will be open, and the resistance of the other derived circuit will be so great that the battery will not be sufficient to set the buzzer in vibration. If, however, the connection is made at a switch in front of the switch at which the test is being made, the circuit will be closed through the derived circuit, which includes the annunciator of the line, and this derived circuit, having low resistance, will permit enough current to pass through the vibrator to set it in operation. This vibration, however, will in no wise affect the telephone, since the derived circuit containing the telephone is open at the switch where the connection is made—that is to say, if the connection or break is back of the switch at which the test is made the buzzer does not respond. If the connection or break is in front of said switch, the vibrator will be set in operation; but the derived circuit containing the listening operator's telephone will be open.

It will be seen that my test system is equally applicable to a single circuit except that in case of single circuits the terminal of the test-plug $c$ and the strand $c'$ connecting the same with ground would not be necessary, since the test-pieces of the switches of single lines are connected directly to ground. Thus in testing single-line circuits the terminal $c$ and branch $c'$ are unnecessary. It is, however, no detriment to the apparatus when applied in testing single-circuit wires, since an extra ground is provided between the test-piece of the switch at which the test is made and the ground.

My invention admits of various modifications, which would readily suggest themselves to those skilled in the art, and I therefore do not limit myself to the constructions shown.

Having thus described my invention, I claim as new and desire to obtain by Letters Patent—

1. The combination, with a spring-jack switch consisting of the lever normally pressing against its contact-point or anvil and the insulated test ring or piece, of a test-plug adapted to be inserted therein, said test-plug containing three terminals, whereby on inserting said test-plug in the spring-jack switch three separate connections are made, one terminal of the plug being connected with the anvil, another with the switch-lever, and the other with the test-piece, while the lever of the switch is at the same time lifted from its anvil, substantially as described.

2. A test-plug consisting of an insulated sleeve forming one terminal, a central needle forming another terminal, and an outer spring or coil forming a third terminal, said terminals being connected, respectively, with different strands of a cord, and two of said terminals—that is to say, the needle and the outer coiled spring—being yielding, substantially as described.

3. The combination, with a ground branch including a battery, of a buzzer and branch wires or circuits from the contact of said buzzer terminating in two different contacts of a plug, substantially as described.

4. The combination, with a ground branch including a battery, of a buzzer and branch wires or circuits from the contact of said buzzer terminating in two different contacts of a plug, one of said contacts being yielding, substantially as described.

5. The combination, with a telephone-line connected with a series of spring-jack switches and through an annunciator back through test pieces or rings of said switches, of a grounded circuit-wire containing a battery and buzzer, said circuit extending from the contact of said buzzer in derived circuit to different terminals of a test-plug or connecting device, one of said branches containing a telephone, said connecting device being provided with a third terminal connected to ground, whereby on applying said plug or connecting device to any spring-jack switch of the line and listening at the telephone it may be determined whether any other one of the spring-jack switches of the line is open or in use.

6. The combination, with a telephone-circuit connected with two or more multiple switch-boards, of a battery, an electro-magnetic signal device, a derived circuit from said signal device, one branch of said derived circuit connecting to one portion of the said telephone-circuit, the other branch of the telephone-circuit connecting with the other portion of the telephone-circuit, whereby both portions of said telephone-circuit may be tested to determine whether or not the line is in use.

In witness whereof I hereunto subscribe my name this 15th day of March, A. D. 1888.

CHARLES E. SCRIBNER.

Witnesses:
CHAS. G. HAWLEY,
CHAS. C. WOODWORTH.